United States Patent [19]

Marion

[11] 3,911,145
[45] Oct. 7, 1975

[54] METHOD OF ENHANCING TEA FLAVOR AND AROMA, AND PRODUCT THEREOF

[75] Inventor: Jean-Paul Marion, Chexbres, Switzerland

[73] Assignee: Societe d'Assistance Technique pour Produits Nestle S.A., Lausanne, Switzerland

[22] Filed: Aug. 9, 1972

[21] Appl. No.: 279,001

[30] Foreign Application Priority Data
Aug. 12, 1971 Switzerland.................... 11843/71
May 15, 1972 Switzerland.................... 7127/72

[52] U.S. Cl. ............... 426/597; 426/223; 426/365; 426/386
[51] Int. Cl.² ........................................... A23F 3/00
[58] Field of Search ............ 426/65, 175, 221, 223, 426/193, 365, 386, 387, 425, 429, 435, 478

[56] References Cited
UNITED STATES PATENTS

| | | | |
|---|---|---|---|
| 1,868,999 | 7/1932 | Strobach et al..................... | 426/429 |
| 2,305,621 | 12/1942 | Kremers......................... | 426/221 X |
| 2,641,550 | 6/1953 | Dykstra et al..................... | 426/386 |
| 2,729,564 | 1/1956 | Keller............................. | 426/478 |
| 3,223,534 | 12/1965 | Kelly............................. | 426/478 X |
| 3,634,098 | 1/1972 | Rhoades et al................... | 426/207 X |
| 3,634,101 | 1/1972 | Rhoades et al................... | 426/207 X |
| 3,645,755 | 2/1972 | Sakato et al.................... | 426/193 X |
| 3,676,156 | 7/1972 | Bentz et al........................ | 426/193 |
| 3,689,278 | 9/1972 | Carbonell....................... | 426/386 X |

OTHER PUBLICATIONS

Journal of Agr. and Food Chem., Vol. 15, No. 1, Jan.-Feb., Nov.-Dec., 1967, pp. 24-35, 1100-1103.
"Tea Aroma", Eiyo to Skokuryo, Vol. 21(4), 1968, Tei Yaminishi.
Fenaroli's Handbook of Flavor Ingredients, Chemical Rubber Co., 1971, Fura et al.

*Primary Examiner*—Frank W. Lutter
*Assistant Examiner*—Steven L. Weinstein
*Attorney, Agent, or Firm*—Watson Leavenworth Kelton & Taggart

[57] ABSTRACT

A beverage composition of enhanced taste and aroma comprises a tea extract and an aromatic extract containing aromatic constituents of one or more of the following fruits: apricot, banana, apple, grape, date, plum and fig, in an amount below the perception threshold of the specific aroma of the fruit in a beverage reconstituted from the composition.

9 Claims, No Drawings

3,911,145

METHOD OF ENHANCING TEA FLAVOR AND AROMA, AND PRODUCT THEREOF

The present invention is concerned with the preparation of water-soluble tea extracts.

The production of tea extracts involves, as principal steps, the aqueous extraction of soluble solids from tea followed by drying. The operating conditions of extraction, especially the temperature, are such that the extraction risks provoking the loss and/or the degradation of at least a part of the aromatic constituents of the tea. Efforts have therefore been made to preserve these aromatic constituents by separating them from the starting material before extraction of soluble matter and returning them to the resulting extract. However, the particular sensitivity of the aromatic constituents of tea to heat treatment limits the possibilities of this separation and an extract enriched with separated aromas generally does not contain all the aromatic constituents of the tea starting material. The result is a final product the aroma of which may be unbalanced or incomplete.

On the other hand, the nature, the quality and the degree of fermentation of the tea leaves used as starting material for extraction exercise a very important influence on the quality of the resulting extract and closely condition the flavour and aroma of the reconstituted beverage made from this extract. In this way, for example, an extract obtained from insufficiently fermented tea leaves gives, after reconstitution with water, a beverage having a woody or green note which it is difficult to correct.

The present invention is essentially directed to tea extracts adapted to provide on reconstitution a beverage having the flavour and aroma of the brew prepared by infusion of good quality black tea leaves. It provides a beverage composition comprising a tea extract and an aromatic extract containing aromatic constituents of one or more of the following fruits: apricot, banana, apple, grape, date, plum and fig, the aromatic extract content of the composition being below the perception threshold of the specific aroma of the fruit in a beverage reconstituted from the composition but sufficient to enhance the taste and aroma of the beverage.

The invention also provides a process for preparing such a composition, which comprises adding an aromatic extract or one or more of the specified fruits to a tea extract, in an amount which is below the perception threshold of the fruit extract in the reconstituted beverage but sufficient to enhance the taste and aroma of the beverage.

By the expression "tea extract" is meant the product obtained by extraction of soluble tea solids. This extraction is generally carried out, as is known, with water, and the resulting extract may be more or less concentrated, for example in liquid or paste form, or dried, for example in powder form. This tea extract may also comprise a greater or lesser amount of the aromatic constituents initially contained in the starting material, constituents which have for example been separated from this starting material before extraction of the soluble matter and have been returned to the final extract.

The expression "beverage reconstituted from the said composition" designates an aqueous solution of the composition prepared in such a way as to substantially reproduce the brew, normally called tea, obtained by infusion of tea leaves and generally containing 3 to 6 g of solids per liter of water.

The expression "aromatic extract containing aromatic constituents of one or more of the following fruits: apricot, banana, apple, grape, date, plum and fig" designates a product obtained by extraction of the fruit with one or more volatile solvents in one or more operations, or a mixture of several of such products.

The aromatising power of the resulting extract depends not only on the fruit itself, but also on the method of extraction used. Thus the nature of the solvent or solvents used and the number of extraction operations exercise a substantial influence on the aromatising power of the extract obtained from a particular fruit. Furthermore it has been observed that volatile solvents such as, for example, ethanol, aqueous ethanol, petroleum ether, halogenated hydrocarbons, acetone, aqueous acetone, or liquid carbon dioxide, have different selective extraction powers on the substances contained in the fruits listed above. Some solvents extract not only an important fraction of the aromatic constituents of these fruits, but also very slightly aromatic or non-aromatic substances such as carbohydrates or proteins, whereas other solvents extract relatively few of these nonaromatic substances and provide extracts with greater aromatising power. Thus, for example, an extract obtained with petroleum ether has a content of aromatic constituents higher than that of an extract obtained with ethanol, because the latter also contains sugars.

The aromatising power of the fruit extract obtained with a given solvent is also dependent on the number of extractions performed because the different fractions extracted successively have decreasing contents of aromatic substances.

The significance of the numerical value of the content of aromatic extract of a specific fruit in a composition according to the invention is thus related to the nature of the extract used, and especially to its aromatising power. It is thus possible to express the content of a composition either as an absolute value for each chosen fruit extract, that is for each extraction method used, or as a value equivalent to the content of a reference extract prepared from the chosen fruit and producing substantially the same organoleptic effects on the reconstituted beverage. The reference extract has been chosen as being the sum of the two first fractions obtained by extraction from the chosen fruit, in dried form, with petroleum ether (boiling point: 40° to 60°C) under the conditions described in Example 1. In this specification, the contents of the compositions according to the invention will therefore be expressed, for each fruit chosen, either in absolute terms for each extract used, or as an equivalent value such as defined above.

The perception threshold in the reconstituted beverage of the specific aroma of the chosen fruit cannot be determined experimentally by quantitative measurement of physical or chemical quantities. The only significant method of determination of this threshhold is organoleptic examination, and it is defined by specifying tasting conditions as well as the selected criteria.

For each fruit, the organoleptic examination was carried out by a panel of 35 trained tasters to whom were submitted 10 samples of beverages having identical dry matter contents, that is 4 g per liter of water, but reconstituted with compositions having increasing contents of the aromatic extract of the fruit considered. Each of these ten samples was submitted in triangle taste tests, which means that each sample is presented in a group of three samples, two of which are the same, and must be identified by the taster in order first to ensure that the tasting is significant. The perception threshhold of the specific aroma of the fruit has been defined as the lowest content by weight of aromatic extract, expressed as a percentage of the weight of dry matter contained in the reconstituted beverage, at which 7 of the 35 tasters detected this aroma in the reconstituted beverage.

The table below summarises the perception threshholds determined for the fruits listed previously. These threshholds are contents by weight of pure aromatic extract of the fruit considered, that is without solvent, and are expressed as equivalent values.

| Fruit | Perception threshold |
|---|---|
| apricot | 0.25 % |
| banana | 0.0026 % |
| apple | 0.07 % |
| grape (sultana) | 0.17 % |
| grape (Corinth raisin) | 0.10 % |
| date | 3.6 % |
| plum | 0.065 % |
| fig | 0.18 % |

A definite improvement in the aroma and flavour of the reconstituted beverage, especially the contribution of a black tea note, was obtained by adding to a tea extract an amount of aromatic extract below the defined perception threshhold.

The choice of the fruit to be used may be made having regard to the flavor and aroma characteristics which it is desired to confer on the composition according to the invention, and taking into account the organoleptic effects peculiar to each fruit. Thus for example an aromatic extract prepared from bananas has a somewhat heavy note and may advantageously be added to a tea extract which has a pronounced green tea note accompanied by a certain amount of bitterness. On the other hand an extract prepared from dried apple brings a lighter aromatic component and may be added to a tea extract the aroma of which is lacking in depth, requiring a complementary black tea note.

Several aromatic extracts prepared from different fruits, or a composite extract obtained from a mixture of fruits may also be added to a tea extract the aroma of which it is desired to improve. These additions are made, of course, in amounts that do not exceed any of the respective perception threshholds of the specific aromas of the chosen fruits. In this case, the perception threshhold may be defined as the lowest total extract content of the composition according to the invention, starting at which 7 of 35 tasters detect either the specific aroma of one of the fruits used, or a fruity aroma superimposed on the aroma of the tea in the beverage reconstituted with this composition.

A complementary note may also be conferred on the composition, according to the desired effects, by incorporating aromatic components such as γ-capro, γ-octa, γ-deca, δ-deca and γ-dodeca lactones, geraniol, geranial, α-terpineol and/or 1- and 2-linalol oxides.

The aromatic extract may be prepared from fresh or, preferably, dried fruits containing for example 20 to 30% of water, by extraction with an organic solvent.

The preparation of dried fruits may be carried out according to known drying methods such as hot-air drying or exposing the fruits to the sun, stoned wherever necessary. The dried fruits are then preferably comminuted in order to facilitate the subsequent extraction operation. For this purpose, a fragmenting method consisting in mechanically grinding the fruits previously frozen to a very low temperature, for example by immersing them in liquid nitrogen boiling at atmospheric pressure (−196°C) is used in preference to a traditional cutting process. This method permits rationalisation of the fragmentation operation and leads to a subdivided product of regular particle size the granules of which do not agglomerate together.

The preparation of the aromatic extract from these fruit fragments is performed with a volatile solvent which does not adversely affect the aromatic qualtities of the constituents extracted, such as petroleum ether, pure or aqueous ethyl alcohol, a halogenated hydrocarbon such as a freon for example, carbon dioxide (liquid) or a mixture of water and acetone.

The fruit fragments may be immersed in the solvent for several hours and stirred periodically. The solvent phase is then recovered and may be concentrated by distillation of the solvent at a moderate temperature, preferably below 30°C, and under a suitable pressure chosen having regard to the thermodynamic characteristics of the solvent.

The fruit fragments thus treated may be subjected to further extractions with the same or different solvents. The recovered resinoids are mixed to form an extract containing most of the principal aromatic constituents of the chosen fruit as well as, depending on the solvents used, non-aromatic or very slightly aromatic substances.

The extraction yield, that is the amount of extract obtained from a particular amount of starting material, is dependent on the origin and the quality of the fruits used. For example two extractions, carried out under identical conditions with apricots coming respectively from Australia and Turkey, provide different quantities of extract, but with similar organoleptic characteristics.

The aromatic extract may be added to the tea extract in various ways. For example, an aqueous or alcoholic suspension of the aromatic extract of the fruit may be sprayed on a powdered tea extract and the extract is mixed and dried. If the equivalent content of the aromatic fruit extract is below the perception threshhold of the specific aroma of the fruit, the resulting composition may be used directly for the preparation of the reconstituted beverage. On the other hand, if the aromatic fruit extract has been added in excess, the composition is then used as an aromatising powder which is mixed with a powdered tea extract in appropriate proportions so that the equivalent content of aromatic fruit extract is below the perception threshhold previously defined.

In a variant of the process, the aqueous or alcoholic suspension of the aromatic fruit extract may be sprayed on a powdered carrier such as a carbohydrate, for example anhydrous dextrose. The aromatised powder is dried and then mixed with a powdered tea extract in proportions such that the equivalent content of aromatic extract is below the perception threshold of the specific aroma of the particular fruit in the reconstituted beverage.

Alternatively, the aromatic fruit extract may be taken up in water and the aqueous suspension of the aromatic constituents thus prepared mixed with a liquid or pasty tea extract. The resulting mixture is then dried, for example by spray- or freeze-drying to form a powder. Depending on the amount of aqueous solution added to the tea extract, the resulting powder may be used either as the final product ready for use, if the amount of aromatic extract is below the perception threshhold of the specific aroma of the fruit in the reconstituted beverage, or as an aromatising powder which may be mixed with a tea extract in the desired proportions.

The aromatic fruit extract may also be added to a liquid tea extract and the resulting suspension dried, for example by spray- or freeze-drying to provide a powder which, depending on its content of aromatic extract, may be used either as a final product or as an aromatising powder.

The invention is illustrated by the following examples. Percentages are by weight.

EXAMPLE 1

5 kg of dried Australian apricots are frozen to −40°C on a stainless steel plate for several hours, then immersed in liquid nitrogen boiling at atmospheric pressure. After immersion for several minutes, the fruits are ground in a Frewit mill equipped with a granulating screen of 2 mm mesh. The fragmented product falls directly into a stainless steel vessel containing 5 to 10 liters of petroleum ether (boiling point: 40° to 60°C). The pieces of fruit are immersed during 5 hours with intermittent stirring. The solid phase is then separated from the liquid phase which is concentrated by evaporation under vacuum with moderate heating, the temperature of the liquid remaining below 30°C. When all the solvent is eliminated 8.5 g of the first extraction fraction are obtained.

The apricot fragments are then subjected to three further extractions each performed under the same conditions as those of the first extraction. In this way three more aromatic fractions weighing respectively 6.9 g, 5.8 g and 4.3 g are obtained.

The perception threshholds are then determined of (1) each of the fractions; (2) the total extract obtained by mixing portions of the four fractions in weight proportions corresponding to the original weights of the individual fractions; and (3) the reference extract, obtained by mixing the first two extract fractions in amounts proportional to the original weights of these two fractions. This is done by first incorporating each of these six aromatic extracts in a medium quality aqueous tea extract, containing 35% solids. Each of these six products is dried to give an over-aromatised tea extract, which is then mixed in varying proportions with a powdered unaromatised tea extract of the same origin. In this way six groups of powdered compositions are obtained. The perception threshholds determined as described previously and expressed in absolute terms, are set out in the table below.

Six powdered compositions are then prepared by mixing with the powdered tea extract mentioned above the six overaromatised tea extracts in proportions such that the contents of aromatic extracts of these six compositions, expressed in absolute terms, are each equal to one-third of the perception threshhold of the aromatic extract used. Beverages reconstituted from these six compositions, at a level of 4 g of powder per liter of water, are submitted to a panel of 35 tasters and compared with a control beverage containing 4 g per liter of non-aromatised tea extract. The results of this organoleptic examination, expressed as points on a scale from 0 to 5, are also given in the table below. These points have the following meaning:

0. Control
1. No intensification of the black tea aroma compared to the control, supplementary note
2. Slight improvement, black tea aroma slightly more pronounced, supplementary note
3. Tea aroma definitely having more character than the control
4. Very pleasant black tea aroma
5. Completely balanced black tea aroma, with body.

| Fraction → | Control | 1 | 2 | 3 | 4 | Reference extract (1 & 2) | Total extract |
|---|---|---|---|---|---|---|---|
| Weight proportion of total extract | | 33.3% | 27% | 22.8% | 16.9% | 60.3% | 100 |
| Perception threshhold, absolute value | | 0.15 | 0.45% | 0.50% | 1.10% | 0.28% (equivalent value) | 0.45% |
| Results of tasting | 0 | 4 | 3 | 2 | 1 | 4 | 5 |

EXAMPLE 2

5 kg of dried Australian apricots are frozen and broken up as described in Example 1, and the resulting fragments are subjected to a first extraction with 70% aqueous ethanol. For this purpose these fragments are immersed for 12 hours in the alcoholic solution with intermittent stirring. The solid phase is then separated from the liquid phase and the latter is concentrated by evaporation under vacuum with moderate heating to a temperature not exceeding 30°C. When all the solvent is eliminated 897 g of first extraction fraction are obtained.

The apricot fragments are then subjected to three further extractions performed under identical conditions. In this way three more fractions are obtained weighing respectively 765 g, 620 g and 600 g.

The perception threshholds of the four fractions and of the total extract reconstituted by mixing portions of the four fractons in weight proportions corresponding to the original weights of the individual fractions, are then determined. This is done by incorporating each of the five aromatic extracts in varying proportions into an aqueous tea extract having the same origin as the extract used in Example 1 and containing 25% solids. Five groups of compositions are thus obtained and the perception threshholds of the five extracts are determined according to the method previously described. These perception threshholds, expressed in absolute terms, are set out in the table below.

Five compositions are then prepared each containing aromatic extract at a level equal to one-fifth of the perception threshold of the extract used. Beverages reconstituted from these five compositions, as at level of 4 g of solids per liter of water, are submitted to the panel of tasters and compared to a control beverage containing the non-aromatised tea extract at a level of 4 g of solids per liter of water. The results of this organoleptic examination, expressed as points on the scale defined in Example 1, are also given in the following table.

| Fraction | Control | 1 | 2 | 3 | 4 | Total extract |
|---|---|---|---|---|---|---|
| Weight proportion on total extract | | 31% | 26.5% | 21.5% | 21% | 100% |
| Perception threshold, absolute value | | 25% | 75% | 100% | 250% | 100% |
| Results of tasting | 0 | 4 | 2 | 0 Acid | 0 Acid | 5 |

EXAMPLE 3

Four extraction fractions are prepared with 70% aqueous ethanol from 5 kg of dried Australian apricots, under the same conditions as in Example 2.

Each of these fractions is then subjected to three successive extractions with petroleum ether (boiling point: 40° – 60°C). For this purpose each of the four fractions is dissolved in one liter of water and an emulsion of petroleum ether is formed in the aqueous solution by using 200 ml of petroleum ether. This emulsion is stirred for 3 minutes and the two immiscible phases are then allowed to separate. The non-aqueous phase is recovered and the petroleum ether eliminated by evaporation under vacuum with moderate heating, at a temperature below 30°C. The aqueous phase is then subjected to two further extractions under the same conditions and the resulting three products are mixed. Four fractions weighing respectively 6.8 g, 5.7 g, 4.9 g and 3.8 g are thus obtained.

The perception threshholds and the organoleptic qualities of these four fractions, as well as those of an extract prepared by mixing the two first fractions in the ratio of the original weights of the fractions, determined as in Example 1, are summarised in the table below.

| Fraction | 1 | 2 | 3 | 4 | 1 + 2 |
|---|---|---|---|---|---|
| Weight proportion on total extract | 32% | 27% | 23% | 18% | 59% |
| Perception threshold, absolute value | 0.15% | 0.45% | 0.5% | 1.10% | (equivalent value) |
| Results of tasting | 4 | 3 | 2 | 1 | 4 |

Extraction with 70% aqueous ethanol followed by extraction with petroleum ether, for each fraction.

The values summarised in this table show that the fractions obtained by extraction with aqueous ethanol followed by petroleum ether have the same aromatising power as the fractions extracted directly with petroleum ether. This also applies to the extract prepared by mixing fractions 1 and 2, which has the same characteristics as the reference extract prepared in Example 1.

These results confirm that in a composition the content of aromatic extract such as that obtained with aqueous ethanol as described in Example 2, may be expressed in equivalent terms. Thus the perception threshhold of the total extract prepared in Example 2, which contains a large amount of slightly aromatic or non-aromatic substances, is expressed by 100 in absolute terms and in equivalent terms by 0.28. Likewise, the content in equivalent terms of any composition according to the invention containing this particular extract may be calculated starting from the content in absolute terms because these values are in the ratio $0.28 \times 10^{-2}$.

EXAMPLE 4

3 kg of dried Australian apricots are frozen and fragmented as described in Example 1. The resulting fragments are subjected to a first extraction with absolute ethanol. For this purpose, they are immersed for 12 hours in absolute ethanol with intermittent stirring. After separation of the solid and liquid phases, the latter is concentrated by evaporation under vacuum with moderate heating, at a temperature below 30°C. After complete elimination of the ethanol 360 g of first extraction fraction are obtained.

Two further extractions carried out with the same apricot fragments, under the same conditions as those of the first extraction, provide two fractions weighing respectively 250 and 110 g.

The perception threshholds are then determined of the three fractions and the total extract reconstituted by mixing portions of these three fractions in the weight ratios of the original fractions. These perception threshholds determined as described in example 2, are summarised in the table below.

On the other hand, an organoleptic examination is performed as described in Example 2 on beverages reconstituted from four compositions each containing an amount of aromatic extract equal to one-fifth of the perception threshholds of the extracts used. The results of this examination, expressed as points on the scale defined in Example 1, are also given in the following table.

| Fraction | Control | 1 | 2 | 3 | Total extract |
|---|---|---|---|---|---|
| Weight proportion on total extract | | 50% | 34.7% | 15.3% | 100% |
| Perception threshold, absolute value | | 17% | 40% | 50% | 35% |
| Results of tasting | 0 | 4 | 2 | 0 Acid | 5 |

EXAMPLE 5

10 kg of dried bananas are frozen to –40°C on a stainless steel plate for several hours, then immersed in liquid nitrogen boiling at atmospheric pressure. After immersion for several minutes, the fruits are ground in a Frewit mill equipped with a granulating screen of 2 mm mesh. The fragmented product falls directly into a stainless steel vessel containing 12 litres of petroleum ether (boiling point: 40° – 60°C). The pieces of fruit are immersed during 5 hours with intermittent stirring. The solid phase is then separated from the liquid phase which is concentrated by evaporation under vacuum with moderate heating, the temperature of the liquid remaining below 30°C. When all the solvent is eliminated 11.2 g of the first extraction fraction are obtained.

The banana fragments are then subjected to two further extractions performed under the same conditions as those of the first extraction. In this way two more fractions weighing respectively 4.6 and 3.6 g are obtained.

The perception threshholds are determined for each of the three fractions, for the total extract, that is the product obtained by mixing portions of the three fractions in weight proportions corresponding to the original weights of the fractions, and for the reference extract, that is the extract prepared by mixing portions of the first two fractions in weight proportions corresponding to the weights of the fractions used. To this purpose, each of these five aromatic extracts is incorporated in a medium quality aqueous tea extract, containing 35% of solids. Each of these five products is then dried to give an overaromatised tea extract, which is mixed in varying proportions with a powdered tea extract of the same origin. In this way five groups of powdered compositions are obtained. The perception threshholds determined as described previously and expressed in absolute terms, are set out in the table below.

Five powdered compositions are then prepared by mixing with the powdered tea extract mentioned above the five overaromatised tea extracts in proportions such that each of the five compositions contains, in absolute terms, an amount of aromatic extract equal to one-third of the perception threshhold of the extract used. Beverages reconstituted from these five compositions at a level of 4 g of powder per liter of water, are presented to a panel of 35 tasters and compared with a control beverage containing 4 g per litre of the non-aromatised tea extract. The results of this organoleptic examination, expressed as points on the scale defined in Example 1, are also given in the table.

this way three more fractions are obtained weighing respectively 630 g, 600 g and 560 g.

The perception threshholds of the four fractions and of the total extract reconstituted by mixing portions of the four fractions in weight proportions corresponding to the original weights of the fractions, are then determined.

Each of the five aromatic extracts is incorporated in varying proportions into an aqueous tea extract having the same origin as the extract used in Example 1 and containing 25% solids to obtain five groups of compositions and the perception threshholds of the five extracts are determined according to the method previously described. These perception threshholds, expressed in absolute terms, are set out in the table below.

Five compositions are then prepared each containing an amount of aromatic extract equal to one-fifth of the perception threshhold of the extract used. Beverages reconstituted from these five compositions at a level of 4 g of solids per liter of water, are submitted to the panel of tasters and compared with a control beverage reconstituted from the non-aromatised tea extract at a level of 4 g of solids per liter of water. The results of this organoleptic examination, expressed as points on the scale defined in Example 1, are also set out in the following table.

| Fraction ⟶ | Control | 1 | 2 | 3 | 4 | Total extract |
|---|---|---|---|---|---|---|
| Weight proportion on total extract | | 36.5% | 22.4% | 21.2% | 19.9% | 100% |
| Perception threshold, absolute value | | 25 % | 85 % | 100 % | 200 % | 100% |
| Results of tasting | 0 | 4 | 2 | 1 sweetish note | 0 | 5 |

| Fraction ⟶ | Control | 1 | 2 | 3 | Reference extract (1 & 2) | Total extract |
|---|---|---|---|---|---|---|
| Weight proportion on total extract | | 57.7% | 23.7% | 18.6% | | 100 |
| Perception threshhold, absolute value | | 0.0012% | 0.006% | 0.015% | 0.0026% (equivalent value) | 0.0040% |
| Results of tasting | 0 | 3 | 2 | 2 | 3 | 4 |

EXAMPLE 6

5 kg of dried figs are frozen and broken up as described in Example 1. The resulting fragments are subjected to a first extraction with 70% aqueous ethanol. For this purpose the fragments are immersed for 12 hours in 6 liters of the alcohol solution with intermittent stirring. The solid phase is then separated from the liquid phase and the latter is concentrated by evaporation under vacuum with moderate heating to a temperature not exceeding 30°C. When all the solvent is eliminated 1030 g of a first extraction fraction are obtained.

The fig fragments are then subjected to three further extractions performed under identical conditions. In

EXAMPLE 7

Four extraction fractions are prepared from 5 kg of dried figs with 70% aqueous ethanol, under the same condition as in Example 6.

Each of these fractions is then subjected to three successive extractions with petroleum ether (boiling point: 40° – 60°C). For this purpose each of the fractions is dissolved in 1 liter of water and an emulsion of petroleum ether is formed in the aqueous solution by using 200 ml of petroleum ether. This emulsion is stirred for 3 minutes and the two immiscible phases are then allowed to separate. The non aqueous phase is recovered and the petroleum ether eliminated by evaporation under vacuum with moderate heating, at a temperature below 30°C. The aqueous phase is then subjected to two further extractions under the same conditions and the resulting three products are mixed. Four fractions weighing respectively 8 g, 4.5 g, 3.5 g and 3.2 are thus obtained.

The perception threshholds and the organoleptic qualities of these four fractions, as well as those of an extract prepared by mixing the two first fractions in the ratio of the original weights of the fractions, determined as in Example 1, are summarised in the table below.

| Fraction | 1 | 2 | 3 | 4 | 1 + 2 (Reference extract) |
|---|---|---|---|---|---|
| Weight proportion on total extract | 41.9% | 23.6% | 18.3% | 16.2% | 65.5% |
| Perception threshhold, absolute value | 0.16% | 0.45% | 0.60% | 1.10% | 0.18% |
| Results of tasting | 4 | 2 | 1 sweetish note | 0 | 4 |

Extraction with 70% aqueous ethanol followed by extraction with petroleum ether, for each fraction.

EXAMPLE 8

Three successive extractions are performed with petroleum ether on 10 kg of frozen fragmented dried apples, according to the method described in Example 5. In this way three fractions of aromatic extract weighing respectively 9 g, 4.4 g and 3.4 g are obtained.

The perception threshholds are determined of the reference extract (reconstituted by mixing the first and second fractions in weight proportions corresponding to the weights of the fractions) and of the total extract (reconstituted from all three fractions in like proportions). This determination is carried out on two groups of compositions prepared by incorporating each of the two extracts in varying proportions in the 35% solids aqueous tea extract used in Example 5. These perception threshholds are set out in the table below.

Two compositions are then prepared containing reference and total extract at a level equal to one-fifth of the perception threshhold of the aromatic extract used. Beverages reconstituted from these two compositions, at a level of 4 g of dry matter per liter of water, are submitted to the panel of tasters and compared with a control beverage reconstituted from the non-aromatised extract at a level of 4 g of dry matter per liter of water. The tasting results, expressed as points on the scale defined in Example 1, are also given in the table below.

| Extract | Reference extract | Total extract | Control |
|---|---|---|---|
| Weight proportion on total extract | 80% | 100% | |
| Perception threshhold, absolute value | 0.07% | 0.12% | |
| Results of tasting | 4 | 4 | 0 |

EXAMPLE 9

Three successive extractions with petroleum ether are performed on 10 kg of dried sultanas, according to the process described in Example 5. Three extraction fractions are obtained weighing respectively 53.6 g, 14.6 g and 7.2 g with which the reference extract (fractions 1 + 2) and total extract (fractions 1 + 2 + 3) are prepared by mixing these fractions in weight proportions corresponding to the weights of the fractions. The perception threshholds of the two extracts are then determined, and their organoleptic qualities are evaluated as described in Example 8. The results obtained are summarized in the table below.

| Fractions | 1 + 2 (Reference) extract) | 1 + 2 + 3 (Total) extract) | Control |
|---|---|---|---|
| Weight proportion on total extract | 90.5% | 100% | |
| Perception threshhold, absolute value | 0.17% | 0.26% | |
| Results of tasting | 4 | 4 | 0 |

EXAMPLE 10

Three extraction fractions are prepared, as described in Example 8, from 10 kg of Corinth raisins, these three fractions weighing respectively 10.2 g, 8.6 g and 6 g. The perception threshholds of the reference extract and the total extract, as well as the results of the organoleptic examination, obtained as described in Example 8, are as follows:

| Fractions | 1 + 2 (Reference) extract) | 1 + 2 + 3 (Total) extract) | Control |
|---|---|---|---|
| Weight proportion on total extract | 76% | 100% | |
| Perception threshhold, absolute value | 0.10% | 0.17% | |
| Results of tasting | 3 | 4 | 0 |

EXAMPLE 11

As described in Example 8, three aromatic fractions are extracted from 5 kg of dried dates. The resulting fractions, weighing respectively 3.6 g, 2.8 g and 2.0 g are used to reconstitute the reference extract and the total extract, the perception threshholds and organoleptic effects of which are determined as described in Example 8.

| Extract | Reference extract | Total extract | Control |
|---|---|---|---|
| Weight proportion on total extract | 76% | 100% | |
| Perception threshhold, absolute value | 3.6% | 5.5% | |
| Results of tasting | 3 | 4 | 0 |

EXAMPLE 12

As described in Example 8, three extraction fractions are prepared from 10 kg of dried prunes, the respective weights of which are 13.6 g, 8.6 g and 5.4 g. The perception threshholds and organoleptic qualities of the reference extract and the total extract, determined as described in Example 8 are as follows:

| Extract → | Reference extract | Total extract | Control |
|---|---|---|---|
| Weight proportion on total extract | 81% | 100% | |
| Perception threshhold, absolute value | 0.065% | 0.095% | |
| Results of tasting | 3 | 4 | 0 |

EXAMPLE 13

Two extraction fractions weighing respectively 8 g and 4.5 g are prepared, in two successive extractions with petroleum ether, from 10 kg of dried figs and these two fractions are mixed in order to obtain 12.5 g of a reference fig extract.

This aromatic extract is then incorporated in 100 ml of an aqueous average quality tea extract containing 30% of dry matter and the extract is dried to obtain 42 g of a powdered over-aromatised tea extract. 11 g of a reference extract are also prepared, in two successive extractions with petroleum ether, from 5 kg of dried prunes. 6 g of this aromatic prune extract are added to 100 ml of the same unaromatised aqueous tea extract and the extract is dried to obtain 36 g of a powdered over-aromatised tea extract.

The two powdered over-aromatised extracts thus prepared are mixed with 72 g of a powdered tea extract obtained by drying the same aqueous tea extract. 150 g of a powdered over-aromatised tea extract are thus obtained, containing a composite extract comprising a fig and a prune extract.

This tea extract is then mixed in varying proportions with a powdered tea extract obtained by drying the aqueous tea extract used previously. A series of samples of beverages reconstituted at a level of 4 g of dry matter per liter of water is prepared with compositions having increasing contents of composite aromatic extract and the perception threshhold of this composite extract is determined as described previously. This perception threshhold, which is the lowest level of composite extract in the composition at which 7 of 35 tasters detect a fruity aroma superimposed on that of the tea, is 0.05%.

A composition containing 0.02% of this composite extract is then prepared and a beverage reconstituted with this composition at a level of 4 g per liter of water is submitted to the panel of 35 tasters. 28 of the 35 tasters gave 5 points to the beverage thus prepared.

I claim:

1. A beverage composition comprising a tea extract and an aromatic extract of a fruit selected from the group consisting of apricot, banana, apple, grape, date, plum, fig and mixtures thereof, said aromatic extract having a fruity aroma and containing aromatic constituents of said fruit, the aromatic extract content of the composition being below the perception threshold of the specific aroma of the fruit in a beverage reconstituted from said composition but sufficient to promote the taste and aroma characteristics of black tea in said beverage.

2. A composition according to claim 1 in which the aromatic extract is an extract obtained from the dried fruit.

3. A beverage reconstituted from a composition according to claim 1.

4. A beverage composition comprising a tea extract and an aromatic extract of apricot, said aromatic extract having a fruity aroma and containing aromatic constituents of apricot, the aromatic extract content of the composition being below the perception threshold of the specific aroma of apricot in a beverage reconstituted from said composition but sufficient to promote the taste and aroma characteristics of black tea in said beverage.

5. A composition according to claim 4 in which the aromatic extract is an extract of dried apricots.

6. A process for preparing a beverage composition which comprises adding to a tea extract an aromatic extract of a fruit selected from the group consisting of apricot, banana, apple, grape, date, plum, fig and mixtures thereof, said aromatic extract having a fruity aroma and containing aromatic constituents of said fruit, in an amount which is below the perception threshhold of the fruit extract in a beverage reconstituted from said composition but sufficient to promote the taste and aroma characteristics of black tea in said beverage.

7. A process according to claim 6 in which the aromatic extract is an extract obtained by extraction of the fruit with a volatile solvent.

8. A process according to claim 6 in which the aromatic extract is an extract obtained from the dried fruit.

9. A process according to claim 7 in which the aromatic extract is an extract obtained by extraction of the fruit with a solvent selected from the group consisting of ethanol, aqueous ethanol, petroleum ether, halogenated hydrocarbons, acetone, aqueous acetone and liquid carbon dioxide.

* * * * *

UNITED STATES PATENT OFFICE
CERTIFICATE OF CORRECTION

PATENT NO. : 3,911,145
DATED : October 7, 1975
INVENTOR(S) : Jean-Paul Marion

It is certified that error appears in the above-identified patent and that said Letters Patent are hereby corrected as shown below:

Column 1, line 46, "extract or" should read --extract of--.

Column 2, line 23, "nonaromatic" should read --non-aromatic--.

Column 3, line 32, "flavor" should read --flavour--.

Column 6, line 5, "overaromatised" should read --over-aromatised--.

Column 6, line 58, "fractons" should read --fractions--.

Column 7, Table in Example 3, last column headed "1 + 2", lines 56, 57 and 58, "(equivalent value)" should read --0.28% (equivalent value)--.

Column 8, line 3, "iin Example" should read --in Example--.

Column 9, line 21, "overaromatised" should read --over-aromatised--.

Column 10, line 59, "condition" should read --conditions--.

Column 11, line 5, "3.2 are" should read --3.2 g are--.

Signed and Sealed this sixteenth Day of March 1976

[SEAL]

Attest:

RUTH C. MASON
*Attesting Officer*

C. MARSHALL DANN
*Commissioner of Patents and Trademarks*